US009639942B2

United States Patent
Tateno

(10) Patent No.: US 9,639,942 B2
(45) Date of Patent: May 2, 2017

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keisuke Tateno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/531,780

(22) Filed: Nov. 3, 2014

(65) Prior Publication Data
US 2015/0125034 A1 May 7, 2015

(30) Foreign Application Priority Data
Nov. 5, 2013 (JP) ................................. 2013-229806

(51) Int. Cl.
*G06K 9/00* (2006.01)
*G06T 7/00* (2017.01)
*G06T 7/73* (2017.01)

(52) U.S. Cl.
CPC .............. *G06T 7/0046* (2013.01); *G06T 7/75* (2017.01); *G06T 2207/10012* (2013.01); *G06T 2207/10016* (2013.01); *G06T 2207/10021* (2013.01); *G06T 2207/10024* (2013.01); *G06T 2207/10028* (2013.01)

(58) Field of Classification Search
CPC ........... G06T 2207/30164; G06T 7/004; G06T 7/0042; G06T 7/0046; G06T 7/0048; G06T 2207/10028; G06T 7/0044
See application file for complete search history.

(56) References Cited

U.S. PATENT DOCUMENTS

| | | | | |
|---|---|---|---|---|
| 8,107,721 B2* | 1/2012 | Beardsley | ............. | G06T 7/0057 382/100 |
| 2009/0066784 A1* | 3/2009 | Stone | .................... | G06T 7/0044 348/47 |
| 2011/0206274 A1* | 8/2011 | Tateno | .................. | G06T 7/0046 382/154 |
| 2012/0121135 A1* | 5/2012 | Kotake | ................... | G01S 5/163 382/103 |
| 2012/0281873 A1* | 11/2012 | Brown | .................. | G06T 19/006 382/103 |

(Continued)

OTHER PUBLICATIONS

Shinsaku Hiura et al., "Real-Time Tracking of Free-Form Objects by Range and Intensity Image Fusion", Systems and Computers in Japan, vol. 29, No. 8, 1998, pp. 19-27.

(Continued)

*Primary Examiner* — Avinash Yentrapati
(74) *Attorney, Agent, or Firm* — Canon U.S.A., Inc. IP Division

(57) ABSTRACT

To calculate the position and orientation of a target object with high accuracy, an information processing apparatus converts an image feature on a two-dimensional image into a corresponding position in a three-dimensional space, acquires a first registration error between the converted image feature and a geometric feature of a model, acquires a second registration error between a distance point and the geometric feature of the model, and then derives the position and orientation of the target object based on the acquired first registration error and the acquired second registration error.

34 Claims, 9 Drawing Sheets

(56) References Cited

U.S. PATENT DOCUMENTS

2013/0076865 A1* 3/2013 Tateno .................. G01B 11/03
                                                    348/46
2013/0245828 A1* 9/2013 Tateno .................. B25J 9/1697
                                                    700/259

OTHER PUBLICATIONS

John Canny, "A Computational Approach to Edge Detection"; IEEE Transactions on Pattern Analysis and Machine Intelligence, vol. PAMI-8, No. 6, Nov. 1986, pp. 679-698.

Roger Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA•3. No. 4, Aug. 1981, pp. 323-344.

* cited by examiner

LOCAL LINE FEATURE

LOCAL SURFACE FEATURE

SHAPE OF OBJECT

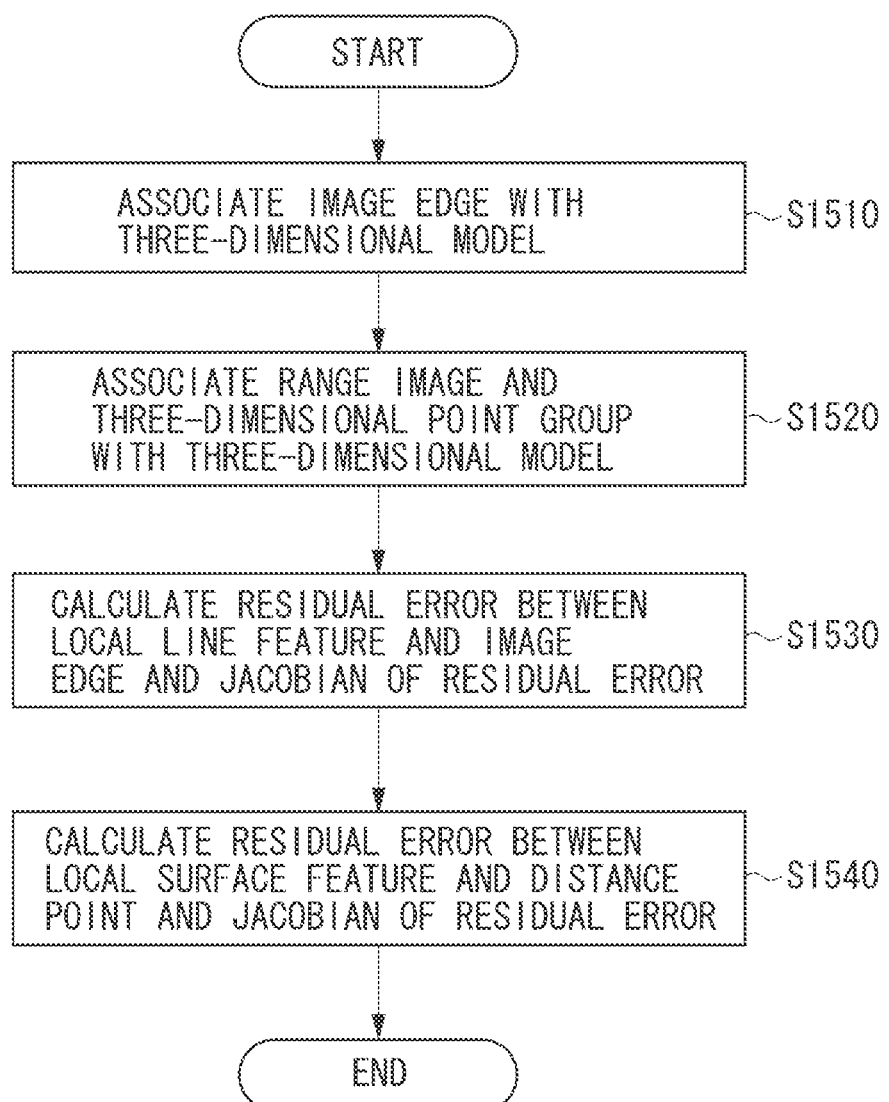

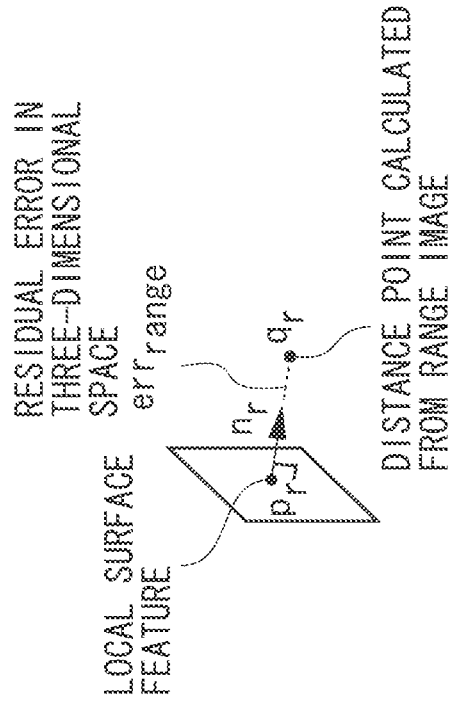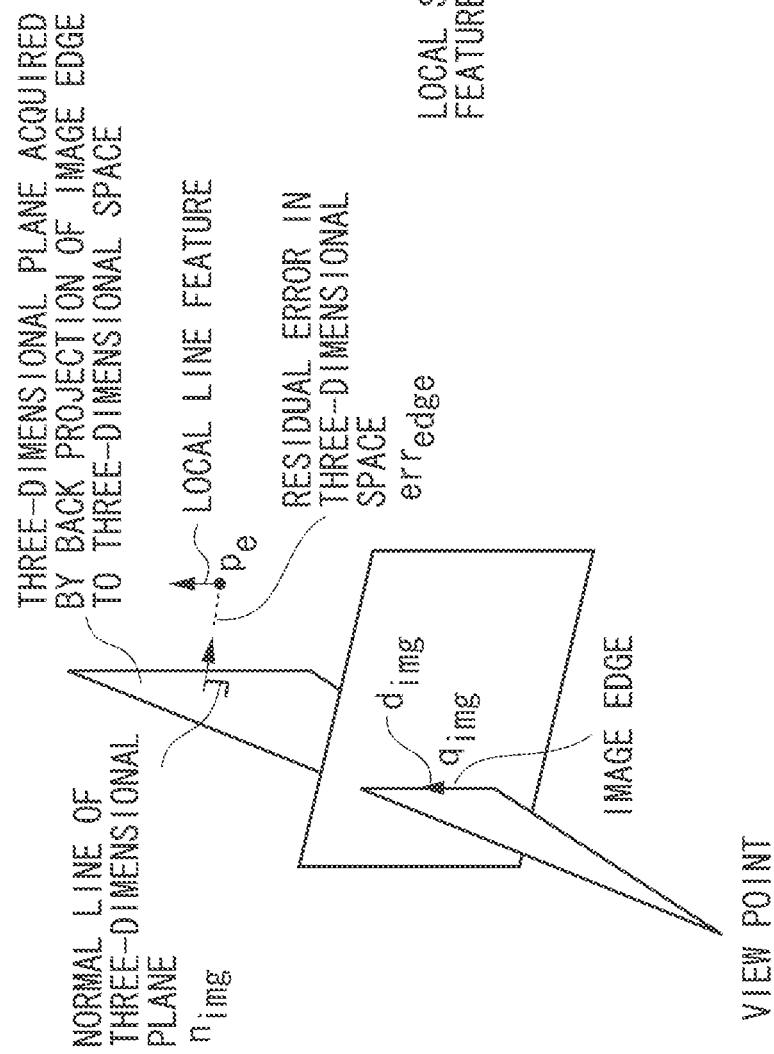

INFORMATION PROCESSING APPARATUS, INFORMATION PROCESSING METHOD, AND STORAGE MEDIUM

BACKGROUND OF THE INVENTION

Field of the Invention

The present disclosure generally relates to information processing and, more particularly, to an information processing apparatus, information processing method, storage medium, and to a technique for measuring a position and orientation of an object having a three-dimensional shape that is known.

Description of the Related Art

With the development of robotics in recent years, robots are now performing complicated tasks that have conventionally been performed by a human, such as assembly of industrial products. The robots use an end effector such as a hand to hold and assemble parts. The assembly necessitates measuring relative positions and orientations between the parts to be held and the robot (hand).

The position and orientation can be measured by a method using model fitting in which a three-dimensional model of an object is fitted to features detected from a two-dimensional image or to a range image. When the model fitting is performed on a two-dimensional image, the position and orientation of an object is estimated so that a projected image acquired by projection of a three-dimensional model of the object on the two-dimensional image based on the position and orientation of the object fits a detected feature. When the model fitting is performed on a range image, each of the points in the range image is converted into a three-dimensional point group having three-dimensional coordinates, and the position and orientation of the object is then estimated so that a three-dimensional model of the object fits the three-dimensional point group in a three-dimensional space.

However, the position of the feature detected in the two-dimensional image and the three-dimensional coordinates of the point group contain an error due to a quantization error in pixels, an error associated with a blur, accuracy of a feature detection algorithm, correspondence between cameras, and the like.

To overcome such an issue, efforts have been made to improve the accuracy of position and orientation measurement, for example that is averaging of the effect of measurement errors contained in a plurality of pieces of measurement information (features on an image or point group), and the like.

As a method for measuring the position and orientation with high accuracy, there is a method in which the position and orientation is estimated using gradients of an intensity image and a range image without explicit feature detection (Hiura, Yamaguchi, Sato, Inokuchi, "Real-Time Tracking of Free-Form Objects by Range and Intensity Image Fusion", Denshi Joho Tsushin Gakkai Ronbunshi, D-II, vol. J80-DII, no. 11, pp. 2904-2911, 1997). In this method, based on the assumption that a brightness change and a range change are smoothly when an object moves, an orientation parameter of the object is calculated from the brightness change of the intensity image and the range change of the range image based on a gradient method. However, since the dimensions are different between the intensity image, which is a two-dimensional image, and the range image, which is a three-dimensional image, it has been difficult to effectively combine the two images. Thus, manual tuning has been required.

According to an exemplary embodiment of the present disclosure, the position and orientation of a target object is estimated using measurement information acquired from a two-dimensional image in combination with measurement information acquired from range data so that the position and orientation of the target object can be measured with high accuracy.

SUMMARY OF THE INVENTION

According to an aspect of the present disclosure, an information processing apparatus includes a storage unit configured to store a model representing a shape of a target object, an approximate position and orientation acquisition unit configured to acquire an approximate position and orientation of the target object, an acquisition unit configured to acquire a two-dimensional image of the target object and information about a three-dimensional point group on a surface of the target object, a detection unit configured to detect an image feature from the acquired two-dimensional image, an association unit configured to associate, based on the approximate position and orientation, the detected image feature with a geometric feature included in the model and to associate a distance point of the three-dimensional point group with the geometric feature included in the model, a first registration error acquisition unit configured to convert the image feature on the two-dimensional image into a three-dimensional space and acquire a first registration error between the converted image feature and the geometric feature of the model, a second registration error acquisition unit configured to acquire a second registration error between the associated distance point and the geometric feature of the model, and a position and orientation derivation unit configured to derive a position and orientation of the target object based on the acquired first registration error and the acquired second registration error.

Further features of the present disclosure will become apparent from the following description of exemplary embodiments with reference to the attached drawings.

BRIEF DESCRIPTION OF THE DRAWINGS

FIG. 4 is a flow chart illustrating a detailed process of three-dimensional registration error calculation processing according to the first exemplary embodiment.

FIGS. 5A and 5B are diagrams each illustrating a calculation of a residual error between a three-dimensional model and an image feature according to the first exemplary embodiment.

DESCRIPTION OF THE EMBODIMENTS

Various exemplary embodiments, features, and aspects of the disclosure will be described in detail below with reference to the drawings.

A position and orientation estimation process according to a first exemplary embodiment will be described in detail below. The term "position and orientation" hereinafter refers to the relative position and orientation relations between a target object and a camera capturing an image of the object.

Figure 1:
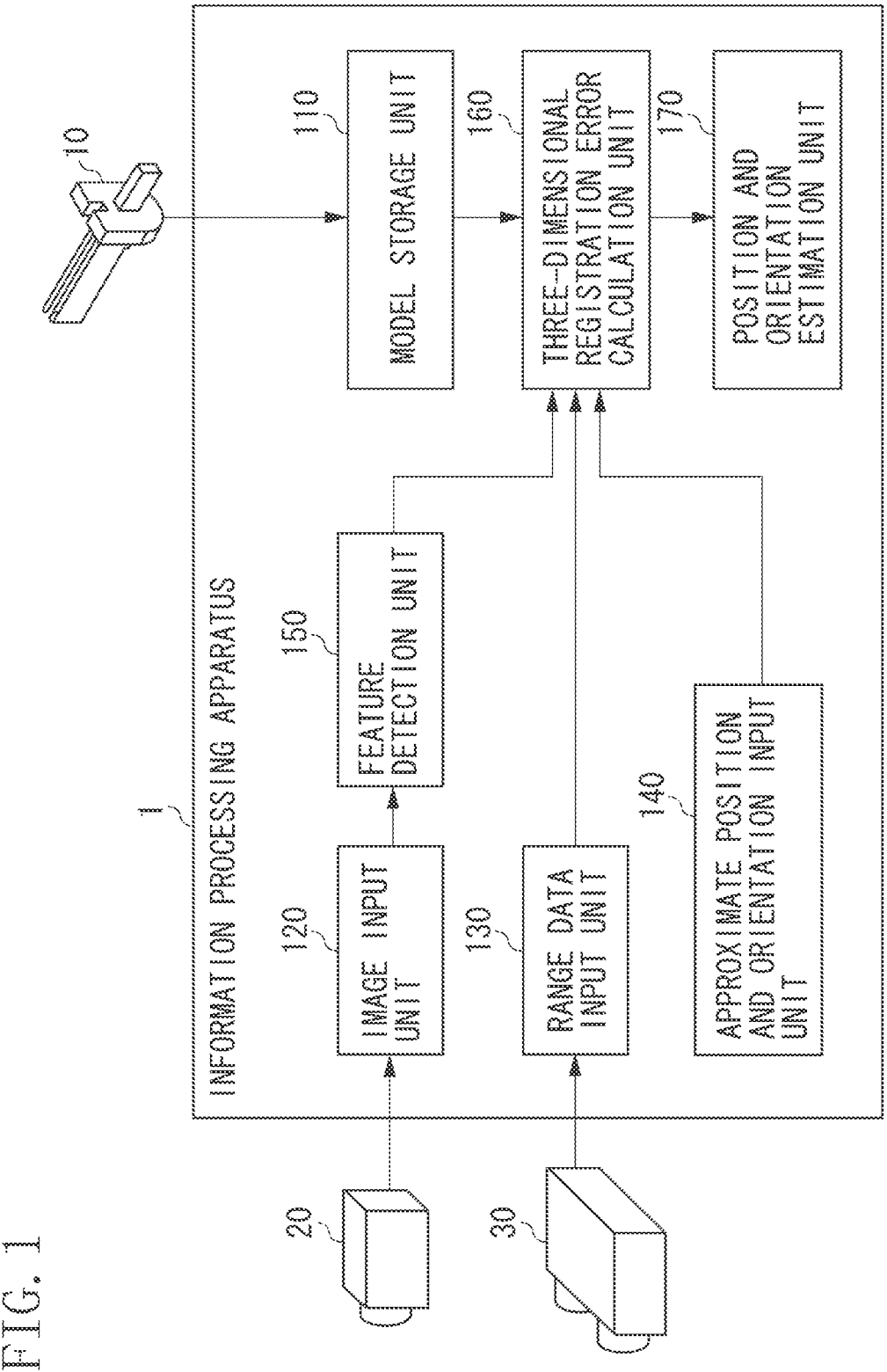
FIG. 1 is a diagram illustrating a configuration of an information processing apparatus according to a first exemplary embodiment.

FIG. 1 is a diagram illustrating a configuration of an information processing apparatus 1 according to the present exemplary embodiment. The information processing apparatus 1 includes a model storage unit 110, an image input unit 120, a range data input unit 130, an approximate position and orientation input unit 140, a feature detection unit 150, a three-dimensional registration error calculation unit 160, and a position and orientation estimation unit 170. The configuration illustrated in FIG. 1 is an application example of the information processing apparatus 1 according to the present exemplary embodiment. It is apparent that the information processing apparatus 1 is realized by an ordinary information processing apparatus in which a computer (central processing unit (CPU)) executes a program stored in a memory to realize a predetermined function. As used herein, the term "unit" generally refers to any combination of software, firmware, hardware, or other component that is used to effectuate a purpose.

Figure 9:
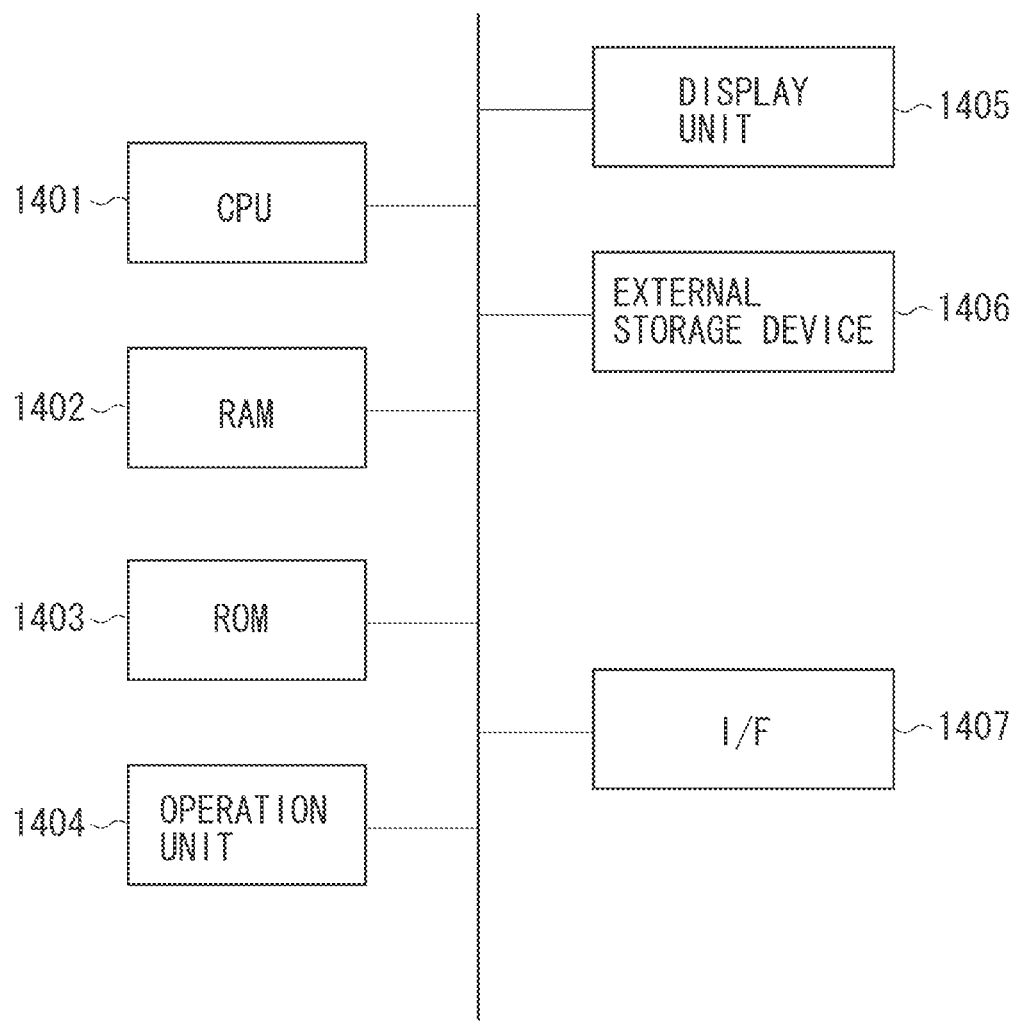
FIG. 9 is a diagram illustrating an example of a hardware configuration of an information processing apparatus.

FIG. 9 is a diagram illustrating an example of a hardware configuration of an apparatus that is applicable to the information processing apparatus 1.

A CPU 1401 executes processing using a computer program or data stored in a random access memory (RAM) 1402 or a read-only memory (ROM) 1403 to control the operation of the entire apparatus and also executes each process described above as a process to be executed by the information processing apparatus 1.

The RAM 1402 includes an area for temporarily storing a computer program and data loaded from an external storage device 1406, data externally received via an interface (I/F) 1407, and the like. The RAM 1402 also includes a work area used by the CPU 1401 when the CPU 1401 executes various types of processing. In other words, the RAM 1402 can provide various types of areas as required. The ROM 1403 stores settings data and a boot program of the information processing apparatus 1, and the like.

An operation unit 1404 includes a keyboard, a mouse, and the like. The user of the apparatus can input various commands to the CPU 1401 by operating the operation unit 1404. For example, the user can designate an area to be adjusted by operating the operation unit 1404.

A display unit 1405 includes a cathode-ray tube (CRT), a liquid crystal screen, and the like. The display unit 1405 can display an image, text, and the like to show a result of processing executed by the CPU 1401.

The external storage device 1406 is a high-capacity information storage device represented by a hard disk drive. The external storage device 1406 stores an operating system (OS) and also stores a computer program and data for causing the CPU 1401 to execute the processes each described above as a process to be executed by a function unit included in the information processing apparatus 1 illustrated in FIGS. 1 and 2. The data includes information described above as known information. The computer program and data stored in the external storage device 1406 are loaded into the RAM 1402 as required according to the control by the CPU 1401 and are then processed by the CPU 1401.

The I/F 1407 is for communications between the information processing apparatus 1 and external devices. For example, an image capturing unit 102, a projector 103, and the like can be connected to the I/F 1407. Each of the foregoing units is connected to a bus 1408.

Each of the units included in the information processing apparatus 1 is described below.

Figure 2A:
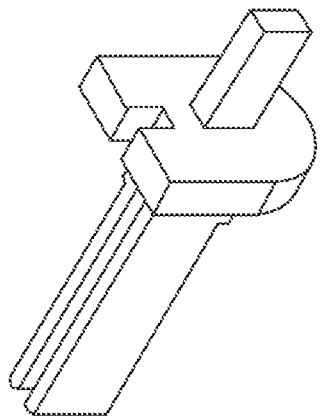
FIGS. 2A, 2B, and 2C are diagrams each illustrating an element of a three-dimensional model according to the first exemplary embodiment.
Figure 2B:
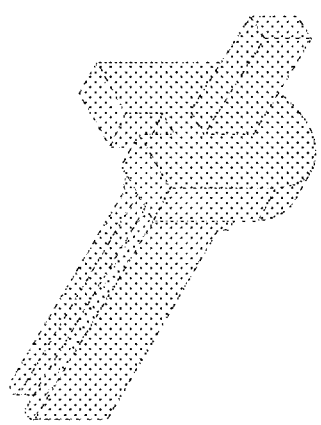
Figure 2C:
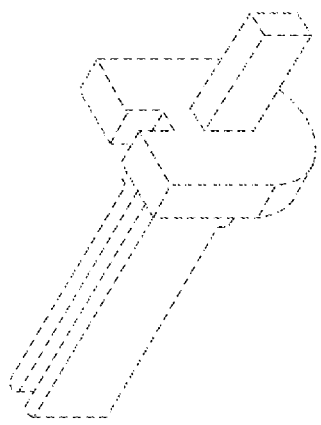

The model storage unit 110 stores a three-dimensional model 10 representing the shape of a target object. According to the present exemplary embodiment, the three-dimensional model 10 (e.g., computer-aided design (CAD) model, polygon model) includes local three-dimensional plane information on an object surface and local three-dimensional line information on an object contour. The local three-dimensional plane information (hereinafter, "local surface feature") includes a three-dimensional position and a three-dimensional normal direction of the target object, as illustrated in FIG. 2B. The local three-dimensional line information (hereinafter, "local line feature") includes a three-dimensional position and a three-dimensional line direction of the target object, as illustrated in FIG. 2A (hereinafter, the term "model feature" refers to the local surface feature or the local line feature).

The form of representation of shape information to be stored as the three-dimensional model is not particularly limited, and the shape information may be any three-dimensional model information that represents a target shape. For example, the shape information can be represented by any other, form such as a set of simple three-dimensional points, a set of three-dimensional lines representing ridge lines, and a polygon form represented by a set of planes and lines including three three-dimensional points. For example, the three-dimensional model can be represented by a set of polygons including three points, three sides, and one plane, or the three-dimensional shape can be represented by a set of simple three-dimensional points. The three-dimensional shape can also be represented by parameters using a combination of implicit functions. The form of representation of the three-dimensional model is not particularly limited, as long as any form that represents the shape of a target object. The three-dimensional model 10 is stored in the model storage unit 110 and input to the position and orientation estimation unit 170.

A two-dimensional image capturing unit 20 is a camera configured to capture a normal two-dimensional image. The captured two-dimensional image may be an intensity image or a color image. According to the present exemplary embodiment, the two-dimensional image capturing unit 20 outputs an intensity image. An image captured by the two-dimensional image capturing unit 20 is input to the information processing apparatus 1 via the image input unit 120. The image input to the information processing apparatus 1 is not limited to images captured by the two-dimensional image capturing unit 20. An image read from a file stored in a storage medium, and the like, or an image read from an external network can be input to the information processing apparatus 1. Internal parameters, such as a focal length, a principal point position, and a lens distortion parameter of a camera, are calibrated in advance by referring to specifications of a device to be used or by the method discussed in R. Y. Tsai, "A versatile camera calibration technique for high-accuracy 3D machine vision metrology using off-the-shelf TV cameras and lenses," IEEE Journal of Robotics and Automation, vol. RA-3, no. 4, 1987.

The image input unit 120 inputs to the information processing apparatus 1 an image captured by the two-dimensional image capturing unit 20. If the output of the two-dimensional image capturing unit 20 is an analog output, such as the National Television System Committee (NTSC), the image input unit 120 is realized by an analog video capture board. If the output of the two-dimensional image capturing unit 20 is a digital output, such as the Institute of Electrical and Electronics Engineers (IEEE) 1394, the image input unit 120 is realized by, for example, an IEEE 1394 interface board. The image input unit 120 may acquire an image by reading digital data of a still or moving image stored in advance in a storage device.

A range image capturing unit 30 measures the three-dimensional information regarding points on a surface of a target object. According to the present exemplary embodiment, a range sensor configured to output a range image is used as the range image capturing unit 30. The range image is an image in which each pixel has depth information.

According to the present exemplary embodiment, the range sensor is a one-shot active range sensor that irradiates a target object with multi-slit lines having color identifications (IDs) for different wavelengths and then captures an image of the reflected light with a camera to measure the distance by triangulation. However, the range sensor is not limited to the one-shot active range sensor and may be a time-of-flight range sensor that uses the flight time of the light. The range sensor may also be a passive range sensor that calculates the depth of each pixel by triangulation from an image captured by a stereo camera. Any sensor configured to measure a range image may be used within the spirit of the disclosure.

The range data input unit 130 inputs to the information processing apparatus 1 a range image measured by the range image capturing unit 30. The range data input to the information processing apparatus 1 is not limited to the range image described above and may be, for example, data that is not in the form of an image, such as a three-dimensional point group. Further, the optical axes of the range image capturing unit 30 and the two-dimensional image capturing unit 20 match each other, and a correspondence between each pixel of the intensity image output by the two-dimensional image capturing unit 20 and each pixel of the range image output by the range image capturing unit 30 is known.

Application of the present exemplary embodiment is not limited to the case in which viewpoints of the intensity image and the range image are the same. For example, the position and orientation of an image capturing unit configured to capture an intensity image may be different from the position and orientation of an image capturing unit configured to capture a range image, and an intensity image and a range image may be captured from different viewpoints. In this case, the relative positions and orientations between the image capturing units are known, and a three-dimensional point group in the range image is projected to the intensity image to determine a correspondence between the intensity image and the range image. As long as the relative positions and orientations between the image capturing units that capture images of the same object are known and a correspondence between the images can be calculated, the positional relationship between the image capturing units is not particularly limited. Hereinafter, a device of a combination of the two-dimensional image capturing unit 20 and the range image capturing unit 30 will be referred to as an image capturing unit 2030.

The approximate position and orientation input unit 140 inputs an approximate value of the position and orientation of a target object with respect to the image capturing unit 2030 including the two-dimensional image capturing unit 20 and the range image capturing unit 30 (acquisition of approximate position and orientation). According to the present exemplary embodiment, the information processing apparatus 1 continuously measures the position and orientation of the object along the direction of a time axis, and the previously-measured value (value measured at previous time) are used as the approximate position and orientation of the object.

The method for inputting the approximate value of the position and orientation, however, is not limited to the above method. For example, the angular velocity and acceleration of an object may be estimated using a time-series filter based on the positions and orientations measured in the past. The current position and orientation of the object may then be calculated from the positions and orientations measured in the past and the estimated angular velocity and acceleration. Further, images of a target object captured at various orientations may be stored as templates, and then an input image may be subjected to template matching (pattern matching) to estimate the approximate position and orientation of the target object. Further, if the position and orientation of an object can be measured by another sensor, an output value of the sensor may be used as the approximate value of the position and orientation.

The sensor may be, for example, a magnetic sensor configured to measure the position and orientation of an object by detecting, with a receiver attached to the object, a magnetic field generated by a transmitter. Further, the sensor may be an optical sensor configured to measure the position and orientation of an object by capturing a marker disposed on the object with a camera fixed to the scene. Any other sensor can also be used that measures the position and orientation of an object of six degrees of freedom. If the approximate position and orientation of an object is already known, a value of the approximate position and orientation may be used as the approximate value.

The feature detection unit 150 detects an image feature from a two-dimensional image input from the image input unit 120. According to the present exemplary embodiment, the feature detection unit 150 detects an edge as the image feature. However, the image feature according to the present exemplary embodiment is not limited to an edge. For example, the feature detection unit 150 may detect a feature point as the image feature. In this case, a three-dimensional model of a target object may be expressed as three-dimensional point group data, and then the position and orientation of the target object may be calculated based on a correspondence between the feature point and the three-dimensional point. Instead of using a specific feature alone, a plurality of features (feature point and edge) may be used to calculate the position and orientation. As described above, the image feature can be any feature that can be associated with the three-dimensional model. Details of feature detection processing will be described below.

The three-dimensional registration error calculation unit 160 calculates a registration error (hereinafter, "residual error") in the three-dimensional space between the three-dimensional model 10 stored in the model storage unit 110 and observation information detected from the intensity image and the range data.

According to the present exemplary embodiment, the distance between the three-dimensional position of the model feature and the three-dimensional plane defined based on the direction and position of the image feature is measured. This is, however, not a limiting method. For example, the three-dimensional position of an image edge may be set tentatively in a direction extending from a viewpoint to the image edge, and then the distance between the three-dimensional position of the image edge and the model feature (geometric feature) may be calculated based on the tentative position without using the direction of the image feature. Further, the residual error between the image feature and the model feature may be calculated based on the shortest distance between an line-of-sight vector extending from the viewpoint to the position of the image feature and a three-dimensional straight line defined by the position and direction of the model feature, without calculating the three-dimensional plane. Any other method can also be used that can measure the residual error between the image edge and the local line feature in the three-dimensional space. Details of the processing according to the present exemplary embodiment will be described below.

The position and orientation calculation unit 170 calculates the position and orientation between the image capturing unit 2030 and a target object based on the amount of a registration error between the intensity image and the range data and the three-dimensional model 10 that is calculated by the three-dimensional registration error calculation unit 160. The present exemplary embodiment is applicable to not only the method for estimating the position and orientation by use of the intensity image and the range image in combination but also the method for estimating the position and orientation by use of the intensity image alone or the range image alone. Details of processing will be described below.

An example of the configuration of the information processing apparatus 1 is described above.

Figure 3:
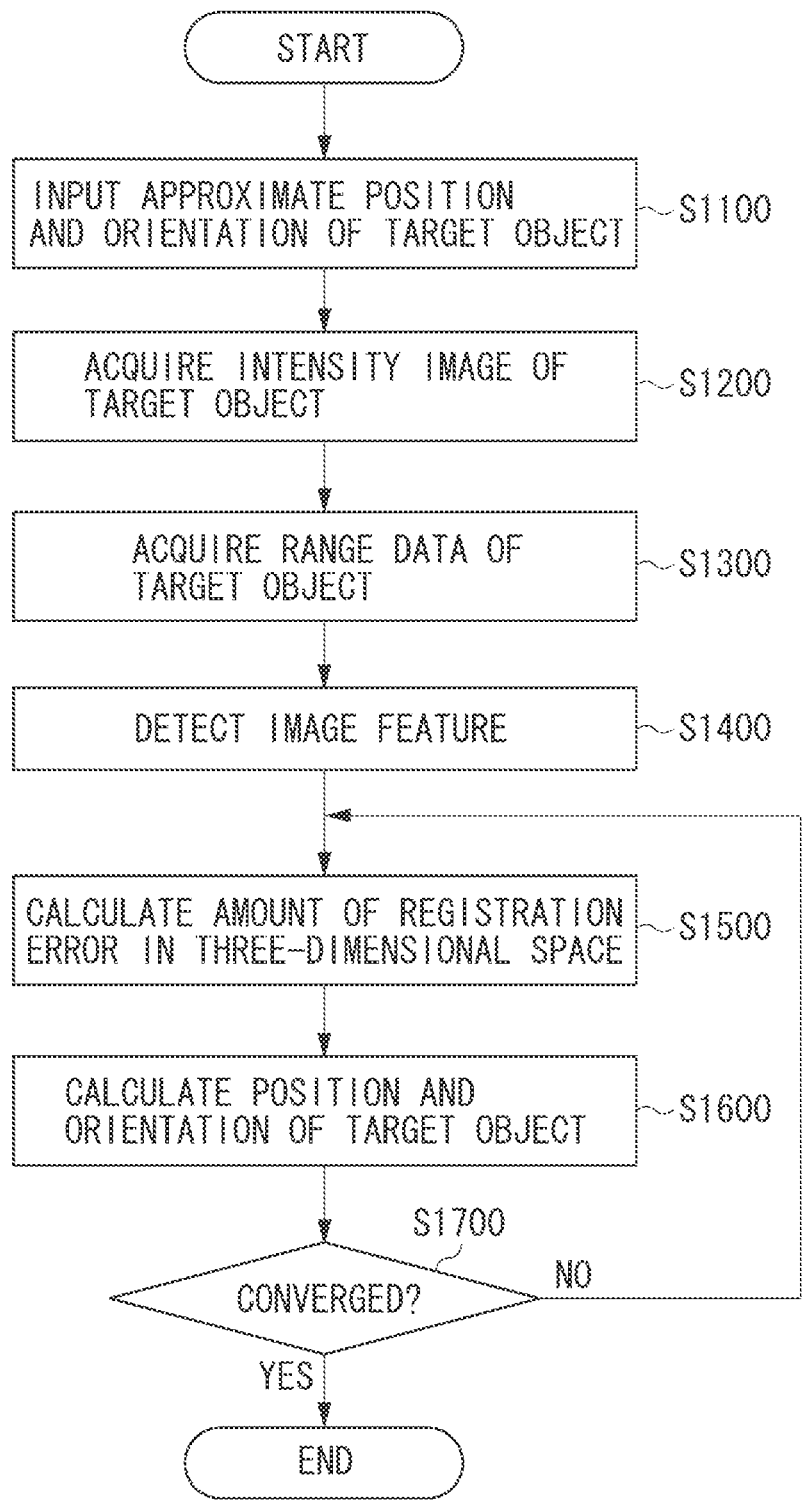
FIG. 3 is a flow chart illustrating a process performed in a position and orientation estimation method according to the first exemplary embodiment.

A position and orientation estimation process according to the present exemplary embodiment is described below. FIG. 3 is a flow chart illustrating the position and orientation estimation process according to the present exemplary embodiment.

In step S1100, an approximate value of the position and orientation of a target object to the image capturing unit 2030 are input to the information processing apparatus 1 via the approximate position and orientation input unit 140. According to the present exemplary embodiment, as described above, the position and orientation of an object that is measured at the previous time are used as the approximate position and orientation of the object. When the input of the approximate position and orientation is completed, the processing of step S1100 ends, and the process proceeds to step S1200.

In step S1200, an intensity image of the target object is acquired. The intensity image is acquired from the two-dimensional image capturing unit 20 and then input to the information processing apparatus 1 via the image input unit 120. When the acquisition of the intensity image is completed, the processing of step S1200 ends, and the process proceeds to step S1300.

In step S1300, a range data of the target object is acquired. The range image is acquired from the range image capturing unit 30 and then input to the information processing apparatus 1 via the range data input unit 130. According to the present exemplary embodiment, the range image contains a distance from the image capturing unit 2030 to a surface of the target object. As describes above, the optical axes of the two-dimensional image capturing unit 20 and the range image capturing unit 30 match each other. Thus, the correspondence between each pixel of the intensity image and each pixel of the range image is known. After the acquisition of the range image, a three-dimensional point group is calculated from the range image. The three-dimensional point group is calculated from the range image by multiplying, for each pixel of the range image, a line-of-sight vector corresponding to the pixel position by a depth value. When the acquisition of the range image and the calculation of the three-dimensional point group are completed, the processing of step S1300 ends, and the process proceeds to step S1400.

In step S1400, an image feature is detected from the intensity image acquired in step S1200. According to the present exemplary embodiment, an edge is detected as the image feature. The edge is a point at which a density gradient is to be an extreme value. The present exemplary embodiment employs as the method for the edge detection the Canny edge algorithm discussed in Canny, J., "A Computational Approach To Edge Detection," IEEE Trans. Pattern Analysis and Machine Intelligence, 8(6):679-698, 1986.

As a result of the edge detection processing, the position and direction of the edge in the intensity image are acquired. The method for the edge detection is not limited to the foregoing method. For example, an edge detection filter, such as a Sobel filter or a Prewitt filter, may be used, and the position and direction of an edge may be calculated from a response value of the edge detection filter. Further, the method for the edge detection is not limited to the method in which an edge is detected from the entire image as described above, and a method in which an edge is locally detected in the vicinity of a focused area may also be used. Any method may be used by which an edge feature that can be associated with the local line feature can be detected on the intensity image, and selection of the edge detection method is not particularly limited. When the detection of every image edge from the intensity image is completed, the processing of step S1400 ends, and the process proceeds to step S1500.

In step S1500, a correspondence between the image edge extracted from the intensity image in step S1400 and the three-dimensional model 10 is calculated, and a correspondence between the range point group input in step S1300 and the three-dimensional model 10 is calculated. Then, the amount of a registration error between the image edge and the corresponding three-dimensional model 10 in the three-dimensional space and the amount of a registration error between of the range point group and the corresponding three-dimensional model 10 in the three-dimensional space are calculated.

According to the present exemplary embodiment, the distance between the three-dimensional position of the local line feature and the three-dimensional plane defined by the viewpoint position (the center of the camera) of the image capturing unit 2030 and the position and direction of the image edge is calculated as a residual error between the image edge and the local line feature. In this way, the residual error standardized in the three-dimensional space can be obtained to estimate the position and orientation.

Details of the three-dimensional registration error calculation processing executed in step S1500 is described below, with reference to FIG. 4.

In step S1510, based on the approximate position and orientation of the target object input in step S1100, the image edge in the intensity image extracted in step S1400 is associated with the three-dimensional model 10. The local line feature included in the three-dimensional model 10 is projected to the intensity image by use of the approximate position and orientation of each object and the calibrated internal parameters of the two-dimensional image capturing unit 30. Then, an area in the vicinity of the projected image is searched to detect an edge, and the detected edge is associated with the local line feature. If multiple edges are detected in the vicinity of the projected image of the local line feature, the closest one of the multiple edges to the projected local line feature on the image is associated with the local line feature.

In step S1520, based on the approximate position and orientation of the target object input in step S1100, the range image and the three-dimensional point group that are acquired in step S1300 are associated with the three-dimensional model 10. Each local surface feature included in the three-dimensional model 10 is projected to the range image using the approximate position and orientation and the calibrated internal parameter of the range image capturing unit 30. Then, a distance point based on a distance value referred to at the position of the projected local surface feature is stored as a three-dimensional point corresponding to the local surface feature.

In step S1530, a residual error between the local line feature and the image edge that are associated and calculated in step S1510 and the Jacobian of the residual error are calculated. As described above, according to the present exemplary embodiment, the three-dimensional plane that passes from the viewpoint position (the center of the camera) of the image capturing unit 2030 through the image edge is calculated, and then the signed distance between the three-dimensional plane and the position of the local line feature is calculated as the residual error between the image edge and the local line feature in the three-dimensional space. FIG. 5A is a diagram illustrating a calculation of the residual error between the three-dimensional plane passing through the image edge and the local line feature.

First, coordinates (u', v') of the image edge in the normalized image coordinate system where the focal length is one are calculated from the image coordinates (u, v) of the image edge to calculate a three-dimensional position $q_{img}$ of the image edge viewed from the viewpoint position. The three-dimensional position $q_{img}$ of the image edge viewed from the viewpoint position can be calculated by the following equation based on the focal length (fx, fy) of the image capturing unit 2030 and the principal point position (px, py):

$$q_{img} = \begin{bmatrix} u' \\ v' \\ 1 \end{bmatrix} = \begin{bmatrix} (u - p_x)/f_x \\ (v - p_y)/f_y \\ 1 \end{bmatrix}. \quad (1)$$

Next, a three-dimensional plane that is a back projection image of the image edge is calculated. As used herein, the term "back projection" refers to projection of data of a lower-dimensional space to a higher-dimensional space. Specifically, a normal line $n_{img}$ of the three-dimensional plane that passes through the viewpoint position and the three-dimensional position $q_{img}$ of the image edge and is parallel to a direction $d_{img}$ of the image edge is calculated. The normal line $n_{img}$ of the three-dimensional plane can be calculated by the equation below using the direction $d_{img}$ of the image edge and the three-dimensional position $q_{img}$ of the image edge:

$$n_{img} = \frac{d_{img} \times q_{img}}{|d_{img} \times q_{img}|}. \quad (2)$$

The signed distance between the acquired plane and point, i.e., the three-dimensional plane and the three-dimensional position of the local line feature, is calculated to calculate a residual error $err_{edge}$ between the image edge and the local line feature in the three-dimensional space. The residual error $err_{edge}$ in the three-dimensional space can be calculated by the equation below using the normal line $n_{img}$ of the three-dimensional plane that is the back projection image of the image edge and the three-dimensional position $q_{img}$ of the image edge:

$$err_{edge} = -n_{img} \cdot (q_{img} - p_e) \quad (3)$$

where $p_e$ denotes the position of the local line feature viewed from the viewpoint position that is calculated based on the approximate position and orientation s of the target object.

Next, the Jacobian of the residual error between the local line feature and the image edge in the three-dimensional space is calculated. The Jacobian of the residual error refers to a value indicating the rate at which the residual error between the local line feature and the image edge changes when the six-degree-of-freedom position and orientation parameter changes infinitesimally. The position and orientation s of the target object is a six-dimensional vector having three components ($s_1$, $s_2$, $s_3$) representing the position of the target object and three components ($s_4$, $s_5$, $s_6$) representing the orientation of the target object. The three components representing the orientation are expressed by, for example, an Euler angle, a three-dimensional vector with the direction representing a rotation axis passing through the origin and the norm representing a rotation angle, and the like. The residual error $err_{edge}$ is partially differentiated with respect to each parameter of the position and orientation s to calculate the following Jacobian determinant:

$$J_{edge} = \begin{bmatrix} \dfrac{\partial err_{edge}}{\partial s_1} & \dfrac{\partial err_{edge}}{\partial s_2} & \dfrac{\partial err_{edge}}{\partial s_3} & \dfrac{\partial err_{edge}}{\partial s_4} & \dfrac{\partial err_{edge}}{\partial s_5} & \dfrac{\partial err_{edge}}{\partial s_6} \end{bmatrix}. \quad (4)$$

The foregoing process is conducted on every combination of the image edge and the local line feature that are associated with each other in step S1510, whereby the residual error between the local line feature and the image edge of every combination in the three-dimensional space and the Jacobian of each of the residual errors are calculated.

In step S1540, a residual error between the local surface feature and the distance point that are associated in step S1520 and the Jacobian of the residual error are calculated. FIG. 5B is a diagram illustrating a calculation of the residual error between the local surface feature and a corresponding point (three-dimensional point in the range image). The residual error between the local surface feature and the distance point can be calculated by the following equation:

$$err_{range} = -n_r \cdot (q_r - p_r) \quad (5)$$

where $p_r$ denotes the position of the local surface feature viewed from the image capturing unit 2030 that is calculated based on the approximate position and orientation s of the target object, $n_r$ denotes the normal direction of the plane, and $q_r$ denotes the three-dimensional coordinates of the distance point corresponding to the local surface feature.

Similarly to the Jacobian of the local line feature, the residual error $err_{range}$ between the local surface feature and the distance point is partially differentiated with respect to each parameter of the position and orientation s of the virtual camera to calculate the Jacobian determinant of the residual error between the local surface feature and the distance point:

$$J_{range} = \left[ \frac{\partial err_{range}}{\partial s_1} \quad \frac{\partial err_{range}}{\partial s_2} \quad \frac{\partial err_{range}}{\partial s_3} \quad \frac{\partial err_{range}}{\partial s_4} \quad \frac{\partial err_{range}}{\partial s_5} \quad \frac{\partial err_{range}}{\partial s_6} \right]. \quad (6)$$

The foregoing process is conducted on every combination of the local surface feature and the three-dimensional point group that are associated with each other in step S1520, whereby the residual error between the local surface feature and the three-dimensional point group of every combination in the three-dimensional space and the Jacobian of each of the residual errors are calculated.

When the calculations of the residual error between the local line feature and the image edge of every combination and the Jacobian of each of the residual errors, and the calculations of the residual error between the local surface feature and the three-dimensional point group of every combination and the Jacobian of each of the residual errors are completed, the processing of step S1500 ends, and the process proceeds to step S1600.

In step S1600, the position and orientation of the target object is calculated to minimize the residual errors calculated in step S1500 (derivation of position and orientation). As described above, the residual error between the image edge and the local line feature and the residual error between the distance point and the local surface feature are measured in the same dimension, as a residual error in the three-dimensional space. Thus, the position and orientation can be estimated using the residual errors of the standardized dimension in combination by solving linear simultaneous equations to minimize the residual errors.

The updated position and orientation to reduce the residual errors can be written as the following linear simultaneous equation with respect to $\Delta s$:

$$\begin{bmatrix} J_{edge0} \\ \vdots \\ J_{edgei} \\ J_{edge0} \\ \vdots \\ J_{edgej} \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} err_{edge0} \\ \vdots \\ err_{edgei} \\ err_{edge0} \\ \vdots \\ err_{edgej} \end{bmatrix} \quad (7)$$

where i denotes the number of local line features associated with edges on the intensity image in step S1510, $err_{edgei}$ denotes the residual error between the local line feature and the image edge in the three-dimensional space that is calculated in step S1530, $J_{edgei}$ denotes the Jacobian of the residual error $err_{edgei}$, j denotes the number of local surface features associated with the distance points in the range image in step S1520, $err_{rangej}$ denotes the residual error between the local surface feature and the distance point in the three-dimensional space that is calculated in step S1540, and $J_{rangej}$ denotes the Jacobian of the residual error $err_{rangej}$.

Equation 7 can be expressed as follows:

$$J\Delta s = E \quad (8)$$

where J denotes the Jacobian, and E denotes the error between associated data.

The correction value $\Delta s$ is obtained by solving Equation 9 using a generalized inverse matrix as follows:

$$\Delta s = (J^T J)^{-1} J^T E \quad (9).$$

The position and orientation is updated using the obtained $\Delta s$.

The foregoing describes a simple non-linear optimization method in which no outlier elimination is conducted. It is also possible to conduct outlier elimination using m estimation, for example. Further, while the present exemplary embodiment uses a Gauss-Newton method as the non-linear optimization method, the non-linear optimization method is not limited to the Gauss-Newton method.

For example, a steepest descent method, which is a simpler method, may be used. Any other non-linear optimization calculation method may also be used, such as a Newton-Raphson method, a Levenberg-Marquardt method, a conjugate gradient method, and an incomplete Cholesky-conjugate gradient (ICCG) method. Further, the position and orientation may be estimated by a method other than the position and orientation calculation based on the optimization calculation. Specifically, a large number of positions and orientations may be generated to exhaustively cover a six-degree-of-freedom value within a predetermined range centered in the approximate position and orientation, and then the degree of matching of a model feature observed at each of the positions and orientations with an intensity image and a range image may be evaluated to estimate the position and orientation. Further, while the foregoing describes the example in which the position and orientation is simultaneously estimated in the position and orientation calculation, the present exemplary embodiment is also applicable to the cases of estimating only the position, only the orientation, or a combination of arbitrary components of the position and the orientation.

When the position and orientation updating processing is completed, the processing of step S1600 ends, and the process proceeds to step S1700.

In step S1700, whether the position and orientation updated in step S1600 are converged, i.e., whether further iterative calculation is necessary, is determined. The updated position and orientation is determined as being converged if the correction value is nearly zero or if a difference between the sum of squares of the error vector that has not been corrected and the sum of squares of the error vector that has been corrected is nearly zero. If the updated position and orientation is not converged, the process returns to step S1500, and the three-dimensional registration error calculation processing and the position and orientation calculation processing are conducted again using the updated position and orientation. If the updated position and orientation is determined as being converged, the process ends.

When the updating of the position and orientation of the target object is completed, a final estimated value of the relative positions and orientations of the image capturing unit and the target object are determined.

As the foregoing describes, according to the present exemplary embodiment, the distance between the three-dimensional plane acquired by back projection of the image feature acquired from the two-dimensional image to the three-dimensional space and the three-dimensional position of the model feature is calculated as the distance between the two-dimensional image and the model, whereby the distance is measured in the standardized dimension as the distance in the three-dimensional space to estimate the position and orientation using the two-dimensional image and the range data in combination. This enables highly accurate position and orientation estimation without a bias in the contribution rate of measurement information. Furthermore, since conversion of the dimension of the residual error of the image edge is unnecessary, the estimation of the position and orientation can be conducted faster than the conventional methods for the estimation of the position and orientation using the intensity image and the range data in combination.

The first exemplary embodiment describes the method for calculating the residual error between the image feature and the model feature in which the distance between the model feature and the three-dimensional plane defined by the direction and position of the image feature acquired from the two-dimensional image and the viewpoint position is calculated. The method for measuring the residual error between the image feature and the model feature in the standardized dimension as the distance in the three-dimensional space is not limited to the method described above.

For example, according to a first modification example, the distance between the model feature and three-dimensional points on a straight line extending from the viewpoint to the position of the image edge may be calculated without using the direction of the image feature. Specifically, the depth value of the three-dimensional position of the image edge is set equal to the depth value of the model feature. Then, the signed distance between the three-dimensional position of the image edge and the three-dimensional plane that passes through the viewpoint position and the three-dimensional position of the model feature and is parallel to the three-dimensional direction of the model feature is calculated.

Details of the method for calculating the residual error based on the three-dimensional position of the image edge by back projection is described below. The following process is a replacement of step S1530 according to the first exemplary embodiment in which the residual error between the image edge and the local line feature is calculated.

Figure 6:
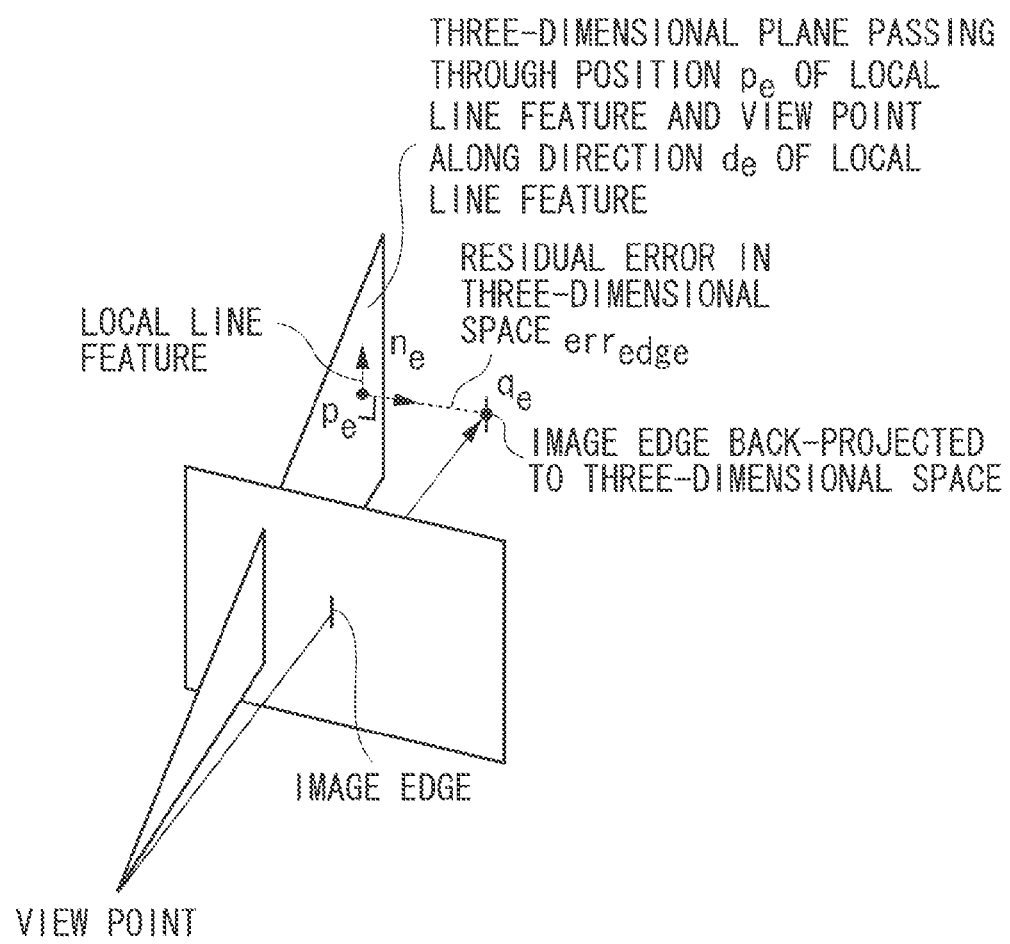
FIG. 6 is a diagram illustrating a calculation of a residual error between a three-dimensional model and an image feature according to a first modification example.

FIG. 6 is a diagram illustrating a calculation of the residual error in the three-dimensional space between the local line feature and the three-dimensional position of the image edge that is tentatively set by back projection.

First, the image edge is back projected to the three-dimensional space, and a tentative three-dimensional position $q_e$ of the image edge in the three-dimensional space is calculated. Let the position of the local line feature viewed from the viewpoint position that is calculated based on the approximate position and orientation s of the target object be $p_e=(p_{ex}, p_{ey}, p_{ez})$. Based on the assumption that the depth value of the three-dimensional position $q_e$ calculated by the back projection of the image edge to the three-dimensional space is equal to the depth value $p_{ez}$ of the local line feature, the tentative three-dimensional position $q_e$ of the image edge is calculated from the position $q_{img}$ of the image edge obtained from Equation 1 by the following equation:

$$q_e=(q_{img}p_{ez}) \qquad (10)$$

Then, based on the obtained three-dimensional position $q_e$ of the image edge, the residual error $err_{edge}$ between the local line feature and the image edge in the three-dimensional space that are associated with each other is calculated. The residual error $err_{edge}$ between the local line feature and the image edge that are associated with each other is calculated as the signed distance between the three-dimensional position $q_e$ of the image edge and the three-dimensional plane that passes through the position $p_e$ of the local line feature and the viewpoint position along the direction $d_e$ of the local line feature. When the normal direction of the three-dimensional plane is expressed as $n_e=d_e \times p_e$, the residual error $err_{edge}$ between the local line feature and the image edge in the three-dimensional space can be calculated by the following equation:

$$err_{edge}=-n_e \cdot (q_e-p_e) \qquad (11)$$

Based on the acquired residual error $err_{edge}$ between the generated local line feature and the image edge in the three-dimensional space, step S1530 and the subsequent steps are performed as in the first exemplary embodiment.

The method for calculating the residual error between the image feature and the model feature is not limited to the method described above or particular methods, and any method may be used that can calculate the residual error between the image feature and the model feature in the three-dimensional space.

The foregoing describes the method for calculating the residual error between the image feature and the model feature in the standardized dimension as the distance in the three-dimensional space in which the distance between the model feature and the three-dimensional points on the straight line extending from the viewpoint to the position of the image edge is calculated without the use of the direction of the image feature.

The first exemplary embodiment and the first modification example describe the method of calculating the residual error between the image feature and the model feature based on the position and direction of the image feature or based on the three-dimensional plane defined by the position and direction of the model feature.

The method for calculating the residual error between the image feature and the model feature is not limited to the above-described method based on the three-dimensional plane. For example, according to a second modification example, the residual error between the image feature and the model feature may be calculated based on the shortest distance between the three-dimensional straight line extending from the viewpoint position to the position of the image feature and the three-dimensional straight line defined by the position and direction of the model feature. Details of a method for calculating a residual error based on the distance between a line-of-sight vector of an image feature and a three-dimensional straight line representing a model feature is described below. The following process is a replacement of step S1530 in which the residual error between the image edge and the local line feature is calculated according to the first exemplary embodiment described above.

Figure 7:
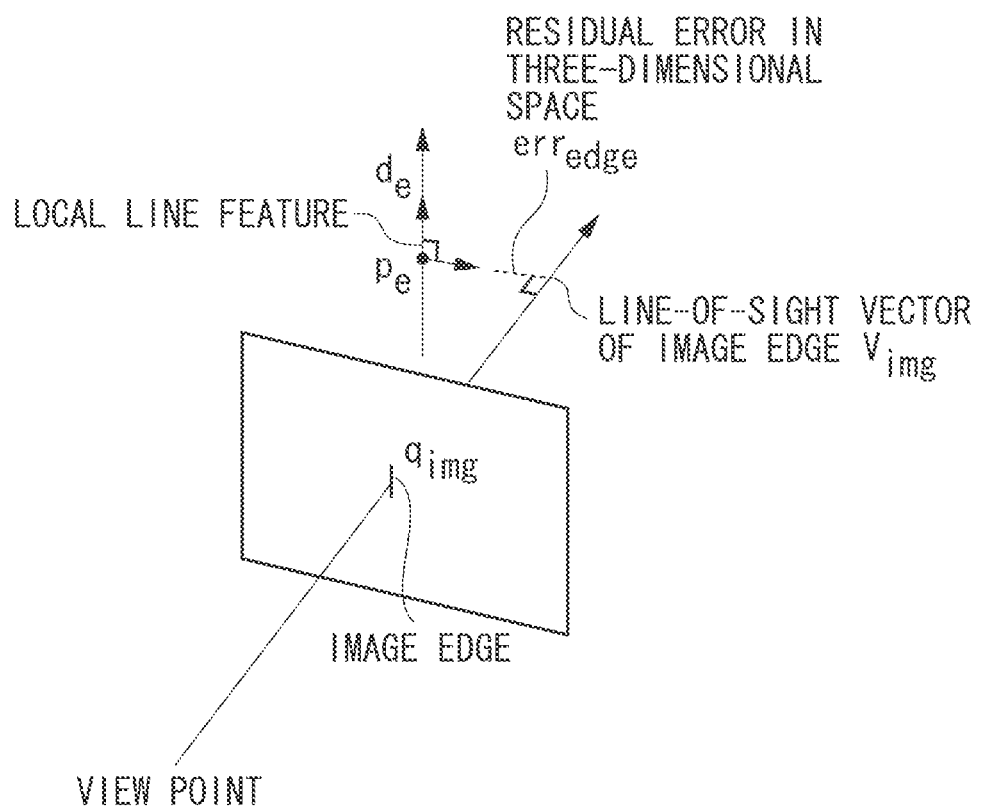
FIG. 7 is a diagram illustrating a calculation of a residual error between a three-dimensional model and an image feature according to a second modification example.

FIG. 7 is a diagram illustrating a calculation of the residual error between the line-of-sight vector of the image feature and the three-dimensional straight line defined by the position and direction of the model feature in the three-dimensional space.

First, when the coordinates of the image edge in the normalized image coordinate system where the focal length is one are expressed as (u', v'), a line-of-sight vector $v_{img}$ of the image edge can be calculated by the following equation:

$$v_{img} = \frac{q_{img}}{|q_{img}|} \qquad (12)$$

$$q_{img} = \begin{bmatrix} u' \\ v' \\ 1 \end{bmatrix}.$$

Then, the shortest distance between the line-of-sight vector $v_{img}$ of the image edge and the three-dimensional straight line defined by the three-dimensional position $p_e$ and the direction $d_e$ of the local line feature is calculated to calculate the residual error $err_{edge}$ between the image edge and the local line feature in the three-dimensional space. A direction n of the shortest distance between the line-of-sight vector of the image edge and the straight line defined by the position and direction of the local line feature can be calculated by the following equation:

$$n = d_e \times v_{img} \quad (13).$$

From the obtained direction n of the shortest distance, the three-dimensional position $p_e$ of the local line feature, and the line-of-sight vector $v_{img}$ of the image edge, the residual error $err_{edge}$ between the image edge and the local line feature in the three-dimensional space is calculated by the following equation:

$$err_{edge} = -n \cdot (v_{img} - p_e) \quad (14).$$

Based on the obtained residual error $err_{edge}$ between the generated local line feature and the image edge in the three-dimensional space, step S1530 and the subsequent steps are performed as in the first exemplary embodiment.

The foregoing describes the method for calculating the distance between the image feature and the model feature based on the shortest distance between the line-of-sight vector extending from the viewpoint to the position of the image feature and the three-dimensional straight line defined by the position and direction of the model feature.

In the foregoing exemplary embodiment and modification examples, the edge is used as the feature on the two-dimensional image. The feature on the two-dimensional image, however, is not limited to the edge and can be any other feature. For example, according to a third modification example, the three-dimensional model of the target object may be expressed by three-dimensional point group data, and a feature point may be detected as the image feature. Then, the position and orientation of the target object may be calculated based on a correspondence between the feature point and the three-dimensional point. Further, instead of using a single type of feature alone, multiple types of features (feature point and edge) may be used to calculate the position and orientation.

Figure 8:
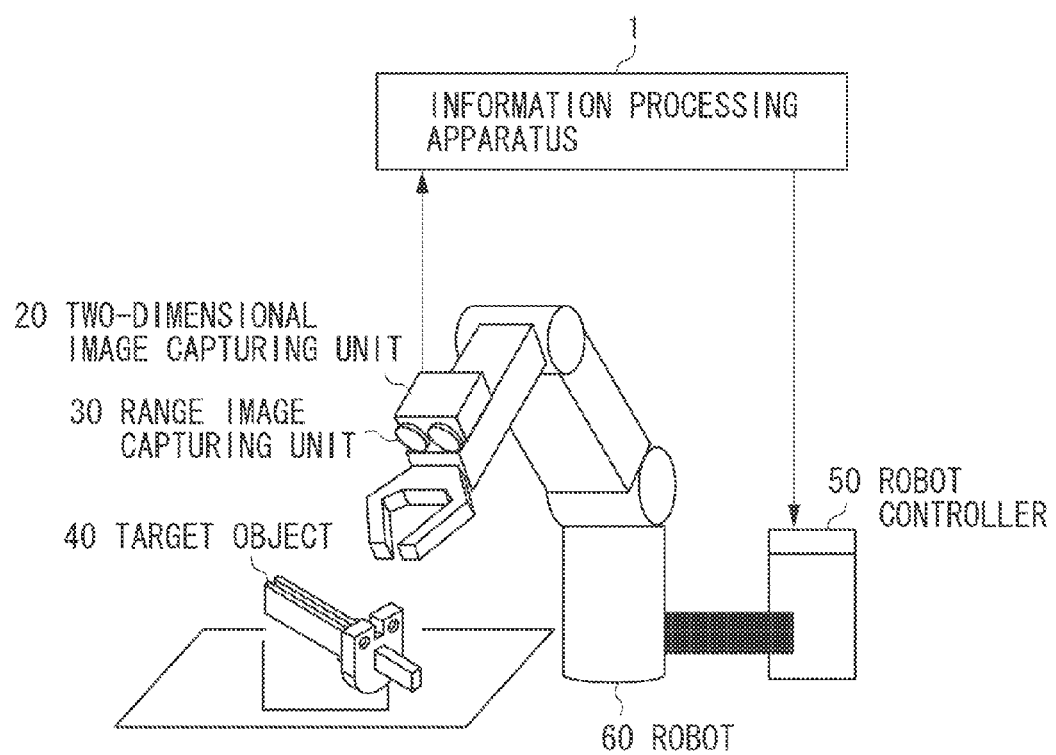
FIG. 8 is a diagram illustrating a configuration of an information processing apparatus according to a second exemplary embodiment.

The information processing apparatus 1 according to an exemplary embodiment of the present disclosure is also applicable to the following case. For example, based on the two-dimensional image and the range image acquired by the two-dimensional image capturing unit 20 and the range image capturing unit 30, the position and orientation of a target object 40 is estimated, and then a robot (industrial robot) 60 performs operations using a robot arm, such as holding, assembling, and separating on the target object 40. An application example of the information processing apparatus 1 according to the second exemplary embodiment is described below, with reference to FIG. 8. FIG. 8 illustrates an example of the configuration of a robot system using the information processing apparatus 1 and the robot 60 to hold the target object 40.

The robot 60 is a robot controlled by a robot controller 50 and configured to move its hand to a commanded position to perform an operation, such as holding, assembling, and separating the object. Since the position of the target object 40 on a work table changes, it is necessary to estimate the current position and orientation of the target object 40 and control the holding operation of the robot.

The two-dimensional image capturing unit 20 is a camera configured to capture a normal two-dimensional image. The range image capturing unit 30 is a range sensor configured to measure the distance of an object surface. The two-dimensional image capturing unit 20 and the range image capturing unit 30 are positioned to capture an image of the target object 40, for example, at a hand of the industrial robot arm.

The information processing apparatus 1 estimates the position and orientation of the target object 40 based on the two-dimensional image and the range image acquired from the two-dimensional image capturing unit 20 and the range image capturing unit 30, respectively. The position and orientation of the target object 40 estimated by the information processing apparatus 1 are input to the robot 60 to control the robot arm to perform a holding operation and the like on the target object 40. The operation of the robot 60 on the target object 40 is not limited to the holding operation described above. For example, the robot 60 may perform an assembly operation to assemble the target object 40 to another object. The information processing apparatus 1 according to the exemplary embodiment of the present disclosure estimates the position and orientation of the target object 40 so that the robot system can perform an operation such as, holding, assembling, and separating on the target object 40, even if the position of the target object 40 is unstable.

The first exemplary embodiment describes the method in which the distance between the three-dimensional plane acquired by back projection of the image feature acquired from the two-dimensional image to the three-dimensional space and the three-dimensional position of the model feature is calculated as the distance between the two-dimensional image and the model, whereby the distance is measured in the standardized dimension as the distance in the three-dimensional space to estimate the position and orientation using the two-dimensional image and the range data in combination. Since the process of converting the dimension of the residual error based on the depth value of the approximate position and orientation as in the conventional methods is not conducted, the position and orientation can be estimated with high accuracy. Furthermore, since the process of converting the dimension of the residual error of the image edge also becomes unnecessary, the position and orientation can be estimated faster than the conventional position and orientation estimation method that uses the intensity image and the range data in combination.

The first modification example describes the method in which the three-dimensional point of the image edge is set to the same position as the depth value of the model feature on the straight line extending from the viewpoint to the position of the image edge, and the distance between the three-dimensional point of the image edge and the three-dimensional position of the model feature is calculated, whereby the residual error is calculated in the standardized dimension to estimate the position and orientation using the two-dimensional image and the range data in combination.

The residual error between the image feature and the model feature is calculated in the three-dimensional space, and the intensity image and the range data of the same evaluation dimension are used in combination, whereby the position and orientation can be estimated with high accuracy. Further, since the direction of the image feature is not used in the calculation of the residual error between the image feature and the model feature, it is not necessary to detect the direction of the image feature in the detection process of the image feature.

The second modification example describes the method for calculating the residual error between the image feature and the model feature in the three-dimensional space based on the shortest distance between the line-of-sight vector extending from the viewpoint to the position of the image feature and the three-dimensional straight line defined by the position and direction of the model feature.

The residual error between the image feature and the model feature is calculated in the three-dimensional space, and the intensity image and the range data are used in combination in the same evaluation dimension, whereby the position and orientation can be estimated with high accuracy.

The third modification example describes the method in which the feature point is detected as the image feature on the two-dimensional image, and the three-dimensional model of the target object is expressed by the three-dimensional point group data. Then, the position and orientation of the target object is calculated based on the correspondence between the feature point and the three-dimensional point.

The image feature is detected as the feature point, and the position and orientation is calculated based on the feature point, whereby the position and orientation can be estimated, even if no edge is acquired as the image feature on the two-dimensional image, as long as the feature point is detected from the two-dimensional image.

The second exemplary embodiment describes the method in which the information processing apparatus 1 according to the exemplary embodiment of the present disclosure estimates the position and orientation of the target object, and the robot system holds and moves the target object based on the estimation result.

Estimation of the position and orientation of the target object enables the robot system to hold the target object even if the position and orientation of the target object is unstable.

According to an exemplary embodiment of the present disclosure, the position and orientation of a target object can be calculated with high accuracy.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-229806 filed Nov. 5, 2013, which is hereby incorporated by reference herein in its entirety.

What is claimed is:

1. An information processing apparatus comprising:
   a storage unit configured to store a first model feature representing a three-dimensional shape model of a target object and a second model feature representing a three-dimensional shape model of the target object;
   an acquisition unit configured to acquire an image feature from a two-dimensional image of the target object and range information of a surface of the target object, wherein the two- dimensional image represents a shape of the target object and is captured by an image capturing unit;
   an association unit configured to associate, based on an approximate position and orientation of the target object, the acquired image feature with the first model feature and to associate a three-dimensional point indicated by the range information with the second model feature;
   a first distance acquisition unit configured to acquire a first three-dimensional distance between a plane and a three-dimensional position corresponding to the associated first model feature, wherein the plane is obtained based on a viewpoint position of the image capturing unit, a two-dimensional position of the associated image feature on the two- dimensional image, and a direction of the associated image feature;
   a second distance acquisition unit configured to acquire a second three-dimensional distance between a three-dimensional position of the associated three-dimensional point and a three-dimensional position of the associated second model feature set at the approximate position and orientation in the three-dimensional space; and
   a position and orientation derivation unit configured to derive a position and orientation of the target object based on the acquired first three-dimensional distance and the acquired second three-dimensional distance,
   wherein the acquisition unit, association unit, first distance acquisition unit, second distance acquisition unit, and position and orientation derivation unit are implemented by at least one processor in the information processing apparatus.

2. The information processing apparatus according to claim 1, wherein the first distance acquisition unit, based on a viewpoint position of an image capturing unit, back-projects the image feature on the two-dimensional image to the three-dimensional space and acquires the three-dimensional position corresponding to the associated image feature.

3. The information processing apparatus according to claim 1, wherein the image feature is converted into the three-dimensional space based on a straight line passing through a viewpoint position of the image capturing unit and a two-dimensional position of the image feature on the two-dimensional image.

4. The information processing apparatus according to claim 1, wherein the plane passes through a viewpoint position of the image capturing unit and two-dimensional position of the associated image feature on the two-dimensional image and is along a direction of theassociated image feature.

5. The information processing apparatus according to claim 1, wherein the range information is a form of a range image, wherein based on the approximate position and orientation, the association unit projects the second model feature to a range image and searches for a three-dimensional point corresponding to the projected second model feature.

6. The information processing apparatus according to claim 1, wherein based on the approximate position and orientation, the association unit projects the first model feature to the two-dimensional image and searches for an image feature corresponding to the projected first model feature.

7. The information processing apparatus according to claim 1, wherein the range information is acquired from a range image obtained by capturing an image of the target object.

8. The information processing apparatus according to claim 1, wherein the position and orientation derivation unit derives the position and orientation of the target object by updating the approximate position and orientation to minimize the acquired first three-dimensional distance and the acquired second three-dimensional distance.

9. The information processing apparatus according to claim 1, wherein the three-dimensional shape model is a computer-aided design (CAD) model.

10. The information processing apparatus according to claim 1, wherein the approximate position and orientation is acquired by performing pattern matching on the two-dimensional image or the information about the three-dimensional point group.

11. The information processing apparatus according to claim 1, wherein the image feature is an edge feature.

12. The information processing apparatus according to claim 1, further comprising:
an image capturing unit configured to capture a two-dimensional image and a range image of the target object,
wherein the range information is acquired from the range image.

13. The information processing apparatus according to claim 1, further comprising an operation unit configured to operate the target object based on a result of estimation of the position and orientation of the target object by the position and orientation derivation unit,
wherein the operation unit is implemented by at least one processor in the information processing apparatus.

14. An information processing method comprising:
storing a first model feature representing a three-dimensional shape model of a target object and a second model feature representing a three-dimensional shape model of the target object;
acquiring an image feature from a two-dimensional image of the target object and range information of a surface of the target object, wherein the two-dimensional image represents a shape of the target object and is captured by an image capturing unit;
associating, based on an approximate position and orientation of the target object, the acquired image feature with the first model feature and to associate a three-dimensional point indicated by the range information with the second model feature;
acquiring a first three-dimensional distance between a plane and a three-dimensional position corresponding to the associated first model feature, wherein the plane is obtained based on a viewpoint position of the image capturing unit, a two-dimensional position of the associated image feature on the two-dimensional image, and a direction of the associated image feature;
acquiring a second three-dimensional distance between a three-dimensional position of the associated three-dimensional point and a three-dimensional position of the associated second model feature; and
deriving a position and orientation of the target object based on the acquired first three-dimensional distance and the acquired second three-dimensional distance.

15. A non-transitory storage medium storing a computer program which, when read and executed by a computer, causes the computer to function as each unit of an information processing apparatus comprising:
a storage unit configured to store a first model feature representing a three-dimensional shape model of a target object and a second model feature representing a three-dimensional shape model of the target object;
an acquisition unit configured to acquire an image feature from a two-dimensional image of the target object and range information of a surface of the target object, wherein the two-dimensional image represents a shape of the target object and is captured by an image capturing unit;
an association unit configured to associate, based on an approximate position andorientation of the target object, the acquired image feature with the first model feature and to associate a three-dimensional point indicated by the range information with the second model feature;
a first distance acquisition unit configured to acquire a first three-dimensional distance between a plane and a three-dimensional position corresponding to the associated first model feature, wherein the plane is obtained based on a viewpoint position of the image capturing unit, a two-dimensional position of the associated image feature on the two-dimensional image and a direction of the associated image feature;
a second distance acquisition unit configured to acquire a second three-dimensional distance between a three-dimensional position of the associated three-dimensional point and a three-dimensional position of the associated second model feature; and
a position and orientation derivation unit configured to derive a position and orientation of the target object based on the acquired first three-dimensional distance and the acquired second three-dimensional distance.

16. The apparatus according to claim 1, wherein the first model feature is a feature on a line of the three-dimensional shape model and the second model feature is a feature on a surface of the three-dimensional shape model.

17. The apparatus according to claim 1, wherein the range information is a form of a range image, and the three-dimensional point represents a three-dimensional position indicated by a pixel value of the range image.

18. An information processing apparatus comprising:
a storage unit configured to store a first model feature representing a three-dimensional shape model of a target object and a second model feature representing a three-dimensional shape model of the target object;
an acquisition unit configured to acquire an image feature from a two-dimensional image of the target object and range information of a surface of the target object, wherein the two-dimensional image represents a shape of the target object and is captured by an image capturing unit;
an association unit configured to associate, based on an approximate position and orientation of the target object, the acquired image feature with the first model feature and to associate a three-dimensional point indicated by the range information with the second model feature;

a first distance acquisition unit configured to acquire a first three-dimensional distance between a plane and a three-dimensional position corresponding to the three-dimensional position corresponding to the associated image feature, wherein the plane is obtained based on a viewpoint position of the image capturing unit, a three-dimensional position of the associated first model feature, and a direction of the associated first model feature;

a second distance acquisition unit configured to acquire a second three-dimensional distance between a three-dimensional position of the associated three-dimensional point and a three-dimensional position of the associated second model feature; and a position and orientation derivation unit configured to derive a position and orientation of the target object based on the acquired first three-dimensional distance and the acquired second three-dimensional distance, wherein the acquisition unit, association unit, first distance acquisition unit, second distance acquisition unit, and position and orientation derivation unit are implemented by at least one processor in the information processing apparatus.

19. The information processing apparatus according to claim 18, wherein the range information is a form of a range image, and wherein based on the approximate position and orientation, the association unit projects the second model feature to a range image and searches for a three-dimensional point corresponding to the projected second model feature.

20. The information processing apparatus according to claim 18, wherein based on the approximate position and orientation, the association unit projects the first model feature to the two-dimensional image and searches for an image feature corresponding to the projected first model feature.

21. The information processing apparatus according to claim 18, wherein the range information is acquired from a range image obtained by capturing an image of the target object.

22. The information processing apparatus according to claim 18, wherein the position and orientation derivation unit derives the position and orientation of the target object by updating the approximate position and orientation to minimize the acquired first three-dimensional distance and the acquired second three-dimensional distance.

23. The information processing apparatus according to claim 18, wherein the three-dimensional shape model is a computer-aided design (CAD) model.

24. The information processing apparatus according to claim 18, wherein the approximate position and orientation is acquired by performing pattern matching on the two-dimensional image or the information about the three-dimensional point group.

25. The information processing apparatus according to claim 18, wherein the image feature is an edge feature.

26. The information processing apparatus according to claim 18, further comprising:
an image capturing unit configured to capture a two-dimensional image and a range image of the target object,
wherein the range information is acquired from the range image.

27. The information processing apparatus according to claim 18, further comprising an operation unit configured to operate the target object based on a result of estimation of the position and orientation of the target object by the position and orientation derivation unit,
wherein the operation unit is implemented by at least one processor in the information processing apparatus.

28. The apparatus according to claim 18, wherein the first model feature is a feature on a line of the three-dimensional shape model and the second model feature is a feature on a surface of the three-dimensional shape model.

29. The apparatus according to claim 18, wherein the range information is a form of a range image, and the three-dimensional point represents a three-dimensional position indicated by a pixel value of the range image.

30. The information processing apparatus according to claim 18, wherein the plane passes through a viewpoint position of the image capturing unit and a three-dimensional position of the associated first model feature and is along a direction of the associated first model feature.

31. The information processing apparatus according to claim 18, wherein the first distance acquisition unit, based on a viewpoint position of the image capturing unit, back-projects the image feature on the two-dimensional image to the three-dimensional space and acquires the three-dimensional position corresponding to the associated image feature.

32. The information processing apparatus according to claim 18, wherein the image feature is converted into the three-dimensional space based on a straight line passing through a viewpoint position of the image capturing unit and a two-dimensional position of the image feature on the two-dimensional image.

33. An information processing method comprising:
storing a first model feature representing a three-dimensional shape model of a target object and a second model feature representing a three-dimensional shape model of the target object;
acquiring an image feature from a two-dimensional image of the target object and range information of a surface of the target object, wherein the two-dimensional image represents a shape of the target object and is captured by an image capturing unit;
associating, based on an approximate position and orientation of the target object, the acquired image feature with the first model feature and to associate a three-dimensional point indicated by the range information with the second model feature;
acquiring a first three-dimensional distance between a plane and a three-dimensional position corresponding to the three-dimensional position corresponding to the associated image feature, wherein the plane is obtained based on a viewpoint position of the image capturing unit, a three-dimensional position of the associated first model feature and a direction of the associated first model feature;
acquiring a second three-dimensional distance between a three-dimensional position of the associated three-dimensional point and a three-dimensional position of the associated second model feature; and
deriving a position and orientation of the target object based on the acquired first three-dimensional distance and the acquired second three-dimensional distance.

34. A non-transitory storage medium storing a computer program which, when read and executed by a computer, causes the computer to function as each unit of an information processing apparatus comprising:
a storage unit configured to store a first model feature representing a three-dimensional shape model of a target object and a second model feature representing a three-dimensional shape model of the target object;

an acquisition unit configured to acquire an image feature from a two-dimensional image of the target object and range information of a surface of the target object, wherein the two-dimensional image represents a shape of the target object and is captured by an image capturing unit;

an association unit configured to associate, based on an approximate position and orientation of the target object, the acquired image feature with the first model feature and to associate a three-dimensional point indicated by the range information with the second model feature;

a first distance acquisition unit configured to acquire a first three-dimensional distance between a plane and a three-dimensional position corresponding to the three-dimensional position corresponding to the associated image feature, wherein the plane is obtained based on a viewpoint position of the image capturing unit, a three-dimensional position of the associated first model feature and a direction of the associated first model feature;

a second distance acquisition unit configured to acquire a second three-dimensional distance between a three-dimensional position of the associated three-dimensional point and a three-dimensional position of the associated second model feature; and a position and orientation derivation unit configured to derive a position and orientation of the target object based on the acquired first three-dimensional distance and the acquired second three-dimensional distance.

\* \* \* \* \*